United States Patent
Aguire Suso et al.

(10) Patent No.: US 11,052,971 B2
(45) Date of Patent: Jul. 6, 2021

(54) FLOATING OFFSHORE PLATFORM

(71) Applicant: NAUTILUS FLOATING SOLUTIONS, SL, Bizkaia (ES)

(72) Inventors: Goren Aguire Suso, Bizkaia (ES); Josean Galván Fernández, Bizkaia (ES); Germán Pérez Morán, Bizkaia (ES); Miren Josune Sánchez Lara, Bizkaia (ES); Jonathan Fernández Ibañez, Leioa-Bizkaia (ES); Jorge Altuzarra Maestre, Leioa-Bizkaia (ES)

(73) Assignee: NAUTILUS FLOATING SOLUTIONS, SL, Bizkaia (IT)

( * ) Notice: Subject to any disclaimer, the term of this patent is extended or adjusted under 35 U.S.C. 154(b) by 151 days.

(21) Appl. No.: 16/473,988

(22) PCT Filed: Dec. 26, 2017

(86) PCT No.: PCT/EP2017/084584
§ 371 (c)(1),
(2) Date: Jun. 26, 2019

(87) PCT Pub. No.: WO2018/122220
PCT Pub. Date: Jul. 5, 2018

(65) Prior Publication Data
US 2020/0307745 A1  Oct. 1, 2020

(30) Foreign Application Priority Data

Dec. 27, 2016  (EP) ..................................... 16382658

(51) Int. Cl.
*B63B 1/10*  (2006.01)
*F03D 13/25*  (2016.01)
(Continued)

(52) U.S. Cl.
CPC .............. *B63B 1/107* (2013.01); *B63B 35/44* (2013.01); *B63B 39/03* (2013.01); *F03D 13/25* (2016.05);
(Continued)

(58) Field of Classification Search
CPC .......... B63B 35/44; B63B 1/107; B63B 39/03
See application file for complete search history.

(56) References Cited

U.S. PATENT DOCUMENTS 7,963,241 B2 * 6/2011 Srinivasan .............. B63B 39/00
114/267
8,418,640 B2 * 4/2013 Leverette ................ B63B 1/107
114/264
(Continued)

FOREIGN PATENT DOCUMENTS

CN  102758447 B  9/2014
EP  2271547 B1  3/2014
(Continued)

OTHER PUBLICATIONS

International Search Report dated Mar. 6, 2018 from PCT Application No. PCT/EP2017/084584.

*Primary Examiner* — S. Joseph Morano
*Assistant Examiner* — Jovon E Hayes
(74) *Attorney, Agent, or Firm* — Innovation Capital Law Group, LLP; Vic Lin

(57) ABSTRACT

A semisubmersible floating platform (1) for supporting at least one wind turbine, comprising four buoyant columns (3), each of them being attached to a ring pontoon (2); a transition piece (4) configured to support one wind turbine, disposed on the buoyant columns (3); and a heave plate (5) assembled to the internal perimeter of the ring pontoon (2). The ring pontoon (2) comprises four pontoon portions forming a quadrilateral-shaped ring pontoon (2) wherein the first end of each column (3) is attached to a respective corner (Continued)

of said quadrilateral-shaped ring pontoon (2). The heave plate (5) is located in the internal perimeter of the ring pontoon (2), both defining a hollow. The pontoon (2) is preferably divided into a plurality of compartments or construction blocks that may be filled with fixed ballast, such as concrete. The transition piece (4) has four arms arranged in star configuration and protruding from a central point at which the wind turbine is located, the connection between the transition piece (4) and the columns (3) being designed to be located above the sea splash zone. Each of the buoyant columns (3) comprises at least one ballast tank configured for allocating sea water in order to adjust the draft and to compensate for the inclination of the platform (1), said at least one ballast tank comprised in each column (3) being independent of the at least one ballast tank of the other columns (3).

15 Claims, 11 Drawing Sheets

(51) Int. Cl.
*B63B 35/44* (2006.01)
*B63B 39/03* (2006.01)
*B63B 77/10* (2020.01)

(52) U.S. Cl.
CPC ......... *B63B 77/10* (2020.01); *B63B 2035/446* (2013.01)

(56) References Cited

U.S. PATENT DOCUMENTS

| | | | |
|---|---|---|---|
| 8,807,874 B2 * | 8/2014 | Zeng | B63B 1/107 405/224.4 |
| 2006/0070568 A1 | 4/2006 | Converse et al. | |
| 2007/0224000 A1 * | 9/2007 | Mills | B63B 77/00 405/203 |
| 2014/0305359 A1 * | 10/2014 | Lambrakos | B63B 39/06 114/126 |

FOREIGN PATENT DOCUMENTS

| | | | | |
|---|---|---|---|---|
| EP | 3342699 A1 * | 7/2018 | | B63B 1/107 |
| JP | 2004291702 A | 10/2004 | | |
| WO | 2012069498 A1 | 5/2012 | | |
| WO | 2014031009 A1 | 2/2014 | | |
| WO | 2014013098 | 3/2014 | | |

* cited by examiner

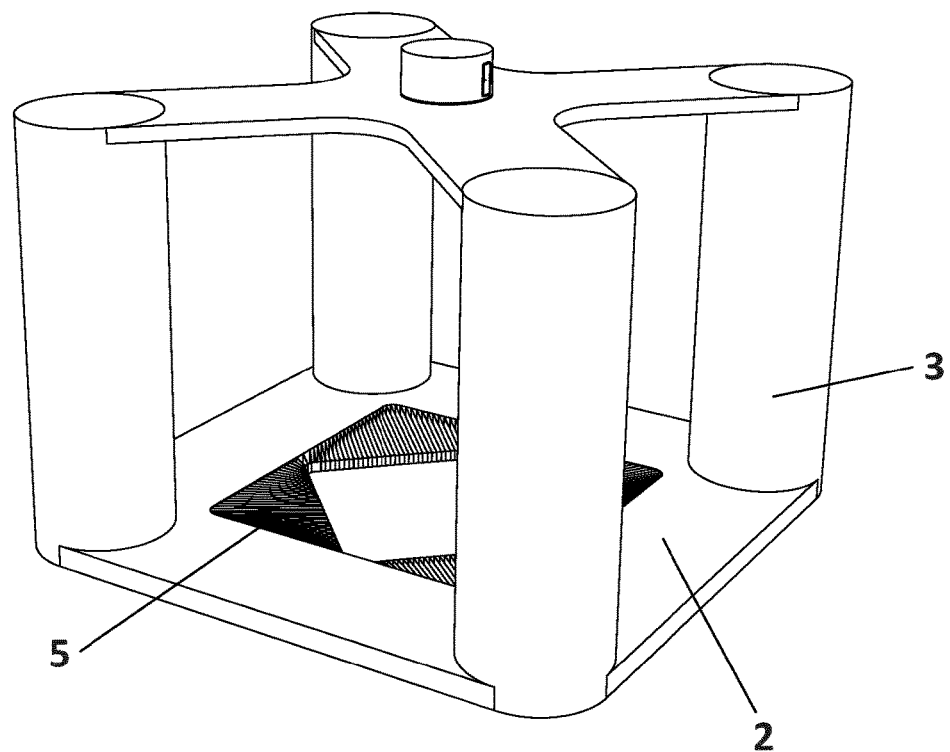
FIG. 8C
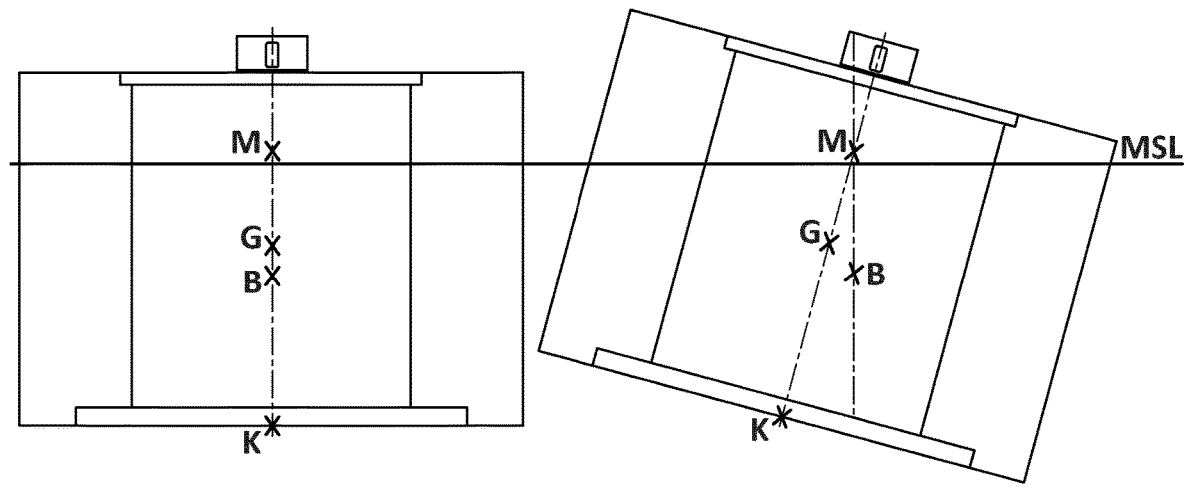
FIG. 9A  FIG. 9B

FLOATING OFFSHORE PLATFORM

TECHNICAL FIELD

The present invention relates to floating offshore structures. More particularly, it relates to semi-submersible floating offshore structures for supporting wind turbines.

STATE OF THE ART

There exists a variety of offshore structures. They usually have a topside structure that houses different equipment depending on their application. Examples of such equipment are piping equipment, drilling devices, storage and energy production devices. The design of the whole structure is normally conditioned by the application it is intended for.

An example of a semisubmersible offshore platform for oil and gas extraction is disclosed in U.S. Pat. No. 8,418,640B2. Other examples of this type of offshore structures are disclosed in US2007224000A1, in U.S. Pat. No. 7,963,241B2, in U.S. Pat. No. 8,807,874B2 and in US2014/305359A1. As a matter of example, US2014/305359A1 discloses a method and system for reducing the vertical motions on semisubmersible floating platforms for the exploration and production of offshore oil and gas. The disclosed platform has a solid square-shaped deck for supporting equipment, facilities and operations of the offshore platform, and a hull formed by four columns coupled with pontoons forming a hull opening. One or more extension plates may be coupled to the pontoons.

There are also semi-submersible floating offshore structures configured to support wind turbines. The structures designed for the Oil&gas sector are bigger and heavier than those designed for offshore wind, as the design considerations/restrictions are significantly different. Oil&gas structures support bigger and heavier equipment, are manned structures, and the nature of their application lead to higher safety levels to avoid oil spills. Thus, the stability criteria must be ensured by means of design safety factors, additional reinforcement elements and bigger elements to provide floatability and minimize the platform movements. Design is driven by safety considerations. For instance, double hull is usually considered and deck space is maximized.

On the other hand, offshore wind structures are unmanned with no risk of spillage or affections to the environment. Design is driven by cost reduction, so the structures must be reduced in size but ensuring stability for the proper wind turbine operation.

Besides, due to the nature of the application, Oil&gas structures do not have restrictions in terms of pitch and roll natural periods, which is the case for offshore wind structures.

An example of semi-submersible floating offshore structure configured to support wind turbines is described in WO2014/031009, which discloses one of such structures having a pontoon structure arranged in a star configuration. The offshore structure has four vertical columns: three of them are disposed on respective ends of the pontoon structure and a fourth one is located on the centre of the pontoon structure. This central column supports the wind turbine. This configuration leads to designs with larger distance between columns, implying that the pontoon that joins them to be larger and more expensive. A similar design is disclosed in CN102758447B, in which an offshore floating structure having three external columns and an internal one is shown. A deck is disposed on the upper ends of the three external columns. The deck has star configuration protruding from a central point, to which the upper end of the internal column is connected. A heave plate is disposed under the columns. However, due to the large dimensions of the heave plate, it moves a large amount of water, which generates very large moments in the connections with the columns that lead to fatigue problems. For this reason, truss members have been disposed to distribute the moment. Truss members are, however, not recommended, because the welds of these elements in environments as aggressive as the marine should be avoided due to fatigue problems. These problems may be overcome using a thicker structure, which implies more weight and the use of large amounts of steel.

In turn, WO2014013098A1 discloses an offshore structure for supporting a wind turbine. It has four outer columns and a fifth internal column designed to support the wind turbine. In this case the structure material is concrete, which leads to a large water displacement and a much bigger platform weight. The five-column configuration provides an advantage in terms of stability, but the structure has a larger flotation area, that makes it more sensitive to the currents, increasing the mooring system complexity and cost.

Another offshore platform for supporting wind turbines is disclosed in EP2271547B1. This platform has three stabilizing columns having an internal volume for containing a ballast fluid. By means of a ballast control system, the ballast fluid moves between the internal volumes of the columns to adjust the vertical alignment of the columns. The three column configuration leads to larger distance between columns to ensure stability. The fact of having the wind turbine on top of one of the columns, leads to a non-symmetrical configuration, making stability more complex. The transfer of ballast between columns is necessary to maintain the verticality of the wind turbine, which makes the system more complex and requires redundancy to ensure its operation in cases of failure or emergency.

Therefore, there is a need for developing a new semi-submersible floating offshore platform that overcomes the disadvantages mentioned above while minimizing the costs.

DESCRIPTION OF THE INVENTION

The present invention attempts to solve the drawbacks mentioned above by means of a new floating offshore platform for supporting wind energy equipment. The platform has four vertical buoyant columns forming, together with a pontoon disposed at the bottom of the four columns and a deck or transition piece disposed at the top of the columns, the main structure of the platform. The floating platform is fixed to the seafloor by means of a mooring system. In operation, the wind turbine and any auxiliary equipment required for producing wind energy are located on top of the transition piece. The platform is aimed at supporting floating offshore wind equipment by providing an optimized technical solution that maximizes energy production of large wind turbines (for example from 5 to 10 MW) while limiting expensive offshore integration and maintenance procedures.

In a first aspect of the invention, it is provided a semi-submersible floating platform for supporting at least one wind turbine. The platform comprises four buoyant columns, each of them being attached at a first end to a ring pontoon; a deck having a transition piece configured to support at least one wind turbine, the transition piece being disposed on the buoyant columns at the end of the columns opposite said first end; and a heave plate assembled to the internal perimeter of the ring pontoon. The ring pontoon comprises four pontoon portions forming a quadrilateral-shaped ring pontoon wherein the first end of each column is attached to a respective corner of said quadrilateral-shaped ring pontoon. The heave plate is located in the internal perimeter of the ring pontoon, the pontoon and heave plate defining a hollow. The transition piece has four arms arranged in star configuration and protruding from a central point at which the wind turbine is located in use of the platform, the connection between the transition piece and the upper end of the four columns being designed to be located above the sea splash zone. Each of the buoyant columns comprises at least one ballast tank configured for, in use of the platform, allocating sea water in order to adjust the draft and to compensate for the inclination of the platform, said at least one ballast tank comprised in each column being independent of the at least one ballast tank of the other columns.

As a skilled person in the art is aware of, a pontoon is a close structure designed to connect side columns of a column-stabilized unit, such a semi-submersible platform, and to provide enough space for ballast. In semi-submersible platforms, the columns are the buoyant structures; consequently, the displacement contribution of the pontoon is balanced by ballast with the aim of lowering the center of gravity, which implies an increase on the metacentric height and therefore a reduction on the heeling angle.

Due to the shape the pontoon of the present invention, which has rectangular cross section, another inherent function of the pontoon is to move sea water mass in vertical motions and rotations, which implies increase the added mass in those degrees of freedom and therefore the natural period of heave/pitch/roll are increased.

Pontoon length influences the pontoon volume, which affects the displacement resulting in larger mass (also added mass) thus larger heave natural period. A change of pontoon length will lead to a big change of water area inertia due to the change of level arm, which will affect the static heeling angle greatly. It should also be noted that the influence on the static heeling angle has a different sign, which means the static heeling angle decreases when the pontoon length increases. Pontoon volume is affected by the change of pontoon width, while the water area and water area inertia are kept the same. It also has some influence on the added mass coefficient as well as on the drag coefficient. Displacement changes with the same speed of pontoon width, while semi mass and heave natural period changes with half of the speed. The static heeling angle changes a little bit due to the slight change of vertical center of gravity. Pontoon height has an influence of pontoon volume and relative larger effect on the vertical center of gravity and buoyancy than other pontoon dimensions. The influence of pontoon height is similar to that of pontoon width.

In embodiments of the invention, the pontoon is divided into a plurality of compartments using bulkheads. In embodiments of the invention, it is stiffened orthogonally with equally spaced ring girders and horizontal stringers.

In embodiments of the invention, the pontoon is totally or partially filled with fix ballast (not removable).

If the beam/length of the platform is defined as the distance between columns plus column diameter, the pontoon does not protrude from this dimension (external vertical shell of the pontoon is tangent to the column).

As a skilled person in the art is aware of, a heave plate (also referred to as a damping plate, because its function is not limited to heave tasks), comprises a flat plate, which is not a buoyant structure), attached, beneath the surface of a sea, and in horizontal orientation, to a structural member subject to being moved in response to passing surface waves. The plate tends to resist movements and has the effect of adding mass to the structure and viscous damping.

The heave plate of the present invention may be triangular or rectangular, and is located at the keel of the structure and is attached to the lowest edge of the pontoon.

In embodiments of the invention, a vertically extending structure, formed by girders and stringers, is added to the surface of the heave plate for increasing the volume of water moved by the plate. The bigger the surface of the heave plate, the bigger the added mass. Moreover, the vertical structure introduces additional viscous damping into the heave/pitch/roll degrees of freedom (which are critical in offshore wind), improves the water entrapment and contributed to the rigidity and structural strength of the heave plate. The number and position of these reinforcements are selected for having structural continuity of the primary structure of the column and pontoon.

In embodiments of the invention, the heave plate is formed by four portions located in the internal perimeter of the ring pontoon, said four portions of which the heave plate is formed being triangle-shape portions or rectangular-shape portions.

In embodiments of the invention, the platform further comprises an active ballast system configured to pump in/off sea water to each ballast tank of said columns, said pumping of sea water being made to each ballast tank independently from the pumping of sea water to other ballast tanks.

In embodiments of the invention, each column is internally stiffened orthogonally with girders and stringers.

In embodiments of the invention, each column is internally divided into a plurality of sections.

In embodiments of the invention, the four columns have a same diameter, the ratio between the distance between two adjacent columns and said column diameter being selected such that the natural period of the platform in heave and the natural period of the platform in pitch/roll (and consequently, the metacentric height) is kept equal to or above 20 seconds, said ratio varying on the wind turbine power. In embodiments of the invention, the rate between the surface of the hollow defined by the pontoon and heave plate and the sum of the surface occupied by the pontoon plus the surface occupied by the heave plate plus the surface of the hollow defined by the pontoon and heave plate is selected such that the added mass is enough to kept the natural period of the platform in heave/roll/pitch out of the typical wave periods (More than 20 s).

In embodiments of the invention, the pontoon is divided into a plurality of compartments configured to be filled with fixed ballast (concrete or water).

In embodiments of the invention, the pontoon internally comprises a stiffening structure comprising girders and stringers.

In embodiments of the invention, the heave plate internally comprises a stiffening structure comprising girders and stringers.

In embodiments of the invention, the heave plate is supported by cantilevered beams ensuring structural continuity of the columns and pontoons reinforcements.

In embodiments of the invention, the platform further comprises a wind turbine generator placed on said central point of the transition piece.

In embodiments of the invention, in use of the platform, the transition piece remains above the wave zone.

In embodiments of the invention, the platform further comprises a catenary mooring system comprising a plurality of catenary mooring lines configured to fix the platform to the seabed.

In embodiments of the invention, the quadrilateral-shaped ring pontoon is a square-shaped ring pontoon.

In the heave plate and pontoon of the present invention, vortices are created around all the edges of the reinforcements, not only with the outer edge, but also with both the edges of the heave plate and the pontoon. This generates much higher damping than that achieved in conventional disclosures. And water is trapped in the different cavities formed by the set formed by the sheet and longitudinal and transversal reinforcements of the heave plate, as well as with the pontoon. This increases the added mass and therefore increases the natural period in 'heave' and 'pich/roll'.

Unlike other prior art structures, the floating offshore platform does not have truss members for avoiding fatigue issues.

Additional advantages and features of the invention will become apparent from the detail description that follows and will be particularly pointed out in the appended claims.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 4A shows a cross section of one portion (construction block) of the pontoon. FIGS. 4B and 4C show in detail the internal structure of the pontoon, how it connects to the lowest end of one of the four columns and the internal structure of part of the heave plate (made of triangular portions in FIG. 4B and of rectangular portions in FIG. 4C).

FIG. 8C shows an isometric view of the semi-submersible floating offshore platform according to an embodiment of the invention.

FIGS. 9A and 9B respectively show the upright floating position and the heeling position of the platform according to embodiments of the invention.

DESCRIPTION OF A WAY OF CARRYING OUT THE INVENTION

In this text, the term "comprises" and its derivations (such as "comprising", etc.) should not be understood in an excluding sense, that is, these terms should not be interpreted as excluding the possibility that what is described and defined may include further elements, steps, etc.

In the context of the present invention, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially".

The following description is not to be taken in a limiting sense but is given solely for the purpose of describing the broad principles of the invention. Next embodiments of the invention will be described by way of example, with reference to the above-mentioned drawings showing apparatuses and results according to the invention.

Figure 1A:
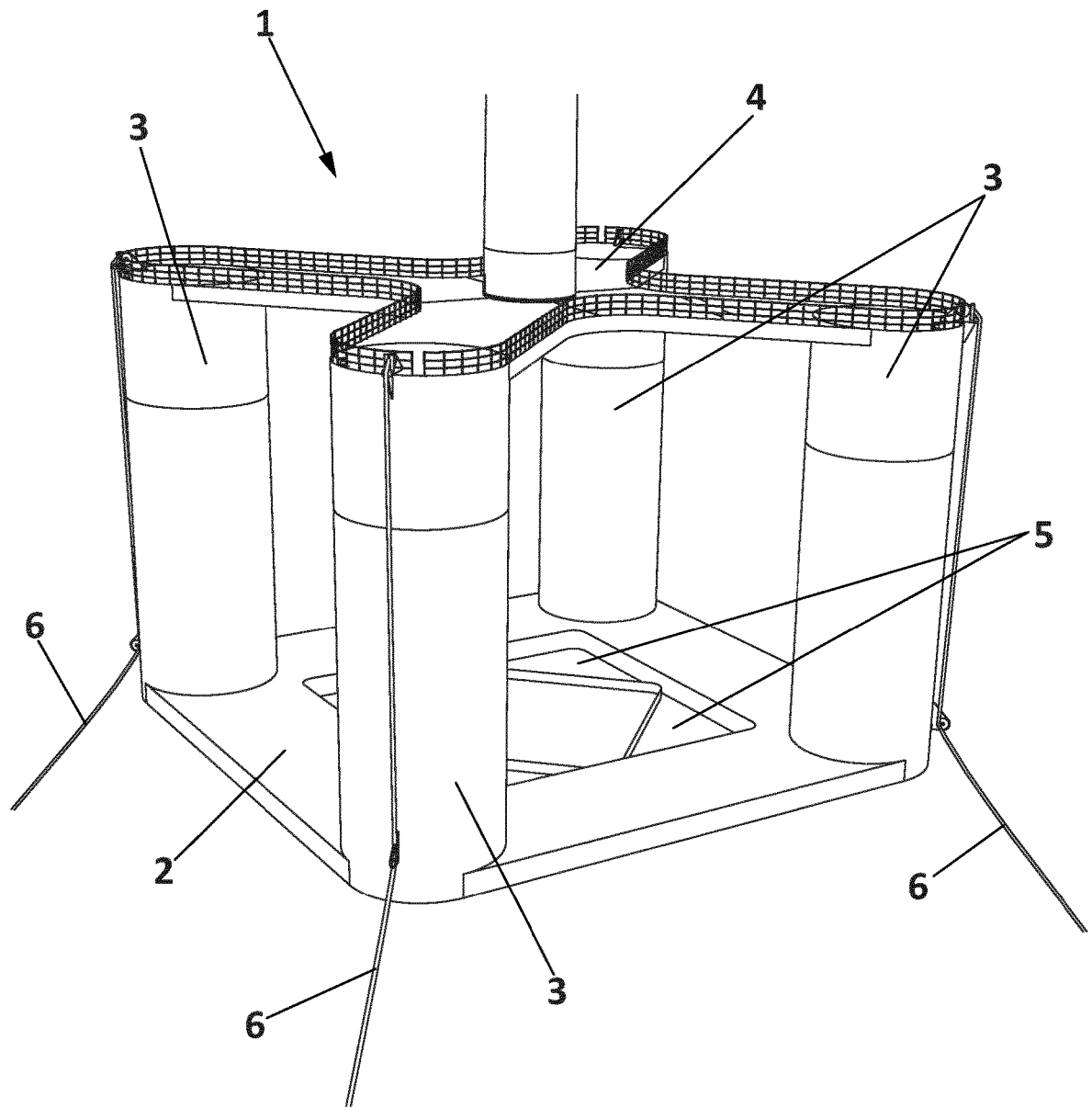
FIGS. 1A and 1B show side views of a semi-submersible floating offshore platform 1 according to an embodiment of the invention.
Figure 1B:
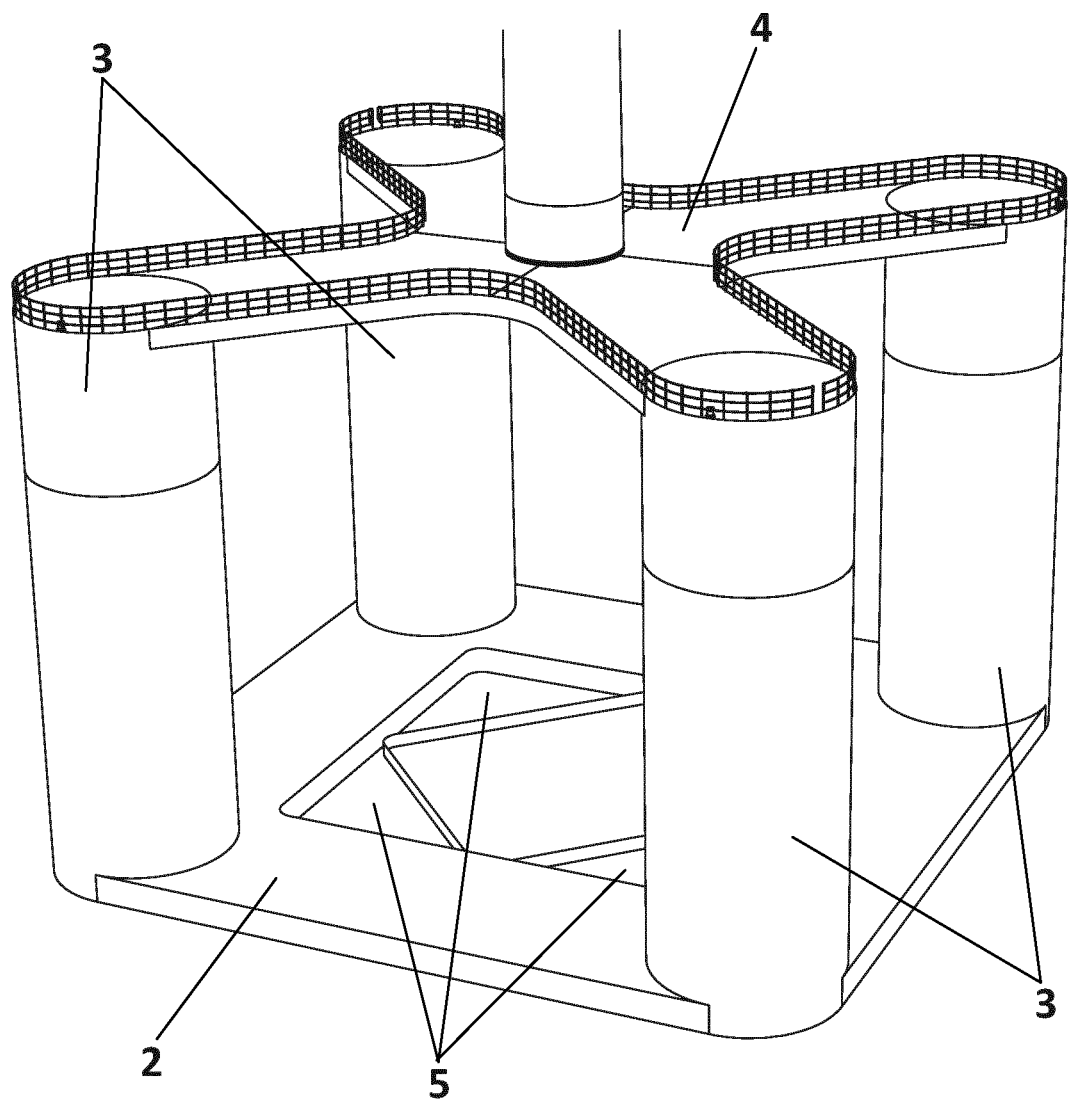

FIGS. 1A and 1B show side views of a semi-submersible floating offshore platform 1 according to an embodiment of the invention. It is a column-stabilized floating platform aimed at supporting offshore wind turbines. The semi-submersible floating offshore platform 1 is generally comprised of a pontoon 2, four buoyant columns 3, a deck including a transition piece 4 and a heave plate 5. The deck is X-shaped. The transition piece is embedded in the central part of the deck 4, in which the wind turbine is located. On top of the transition piece 4, standard topside equipment normally provided on an offshore structure is disposed. In this case, a wind turbine and optionally auxiliary equipment for the wind turbine is installed on transition piece 4. In the context of the present invention, the expression "wind turbine" is used to refer to wind turbines and any related equipment required for obtaining offshore wind energy, such as wind turbine generators, blades, a tower, a nacelle, etc. Each buoyant column 3 has a vertical longitudinal axis substantially parallel to the longitudinal axis defined by the tower of the wind turbine. The pontoon 2 is a ring pontoon. In this text, the term "ring" refers to a structure defining a hollow portion, irrespective of the shape it adopts. This means that a ring pontoon according to the invention does not necessarily have circular shape. In fact, the ring pontoon 2 of the invention is preferably a square-shaped ring pontoon. In other words, the pontoon 2 defines a centered space or centered well. As shown in FIGS. 1A and 1B, each corner of the ring pontoon 2 receives the bottom part of one of the four columns 3. In other words, the bottom part of each column 3 is connected to or integrated in one of the four corners of the ring pontoon 2. Thus, the columns 3 are rigidly attached to the pontoon 2.

Figure 6A:
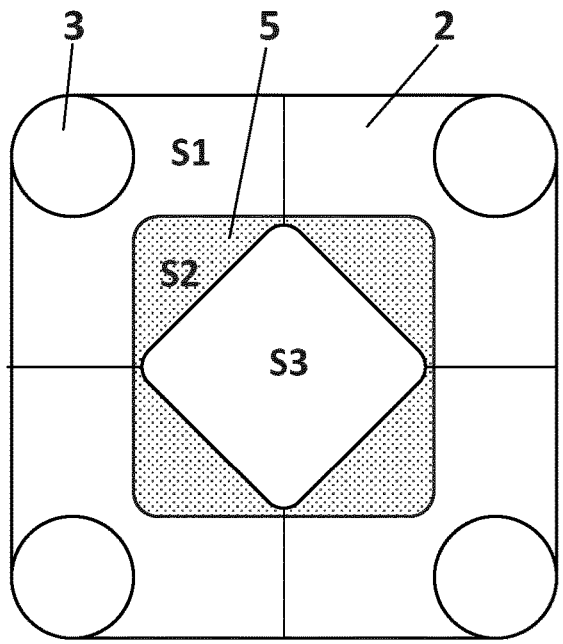
FIG. 6A shows a top view of the semi-submersible floating offshore platform according to an embodiment of the invention, including the pontoon, heave plate and four columns. The transition piece is not shown.
Figure 6B:
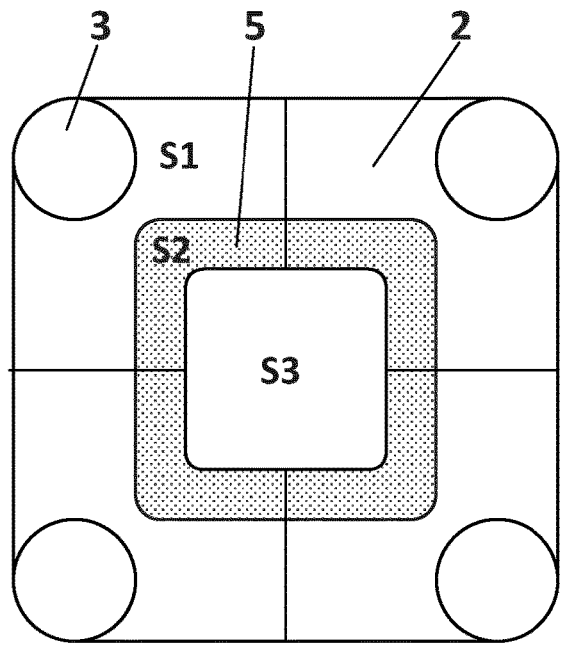
FIG. 6B shows a top view of a semi-submersible floating offshore platform according to an alternative embodiment of the invention, in which the heave plate is implemented differently from the one in FIG. 6A.

The heave plate 5 is assembled or embedded to the pontoon 2. It is substantially flat. The heave plate 5 is located in the internal perimeter of the ring pontoon 2. In the embodiment shown in FIGS. 1A and 1B, the heave plate 5 is made of four portions of substantially right-angle triangle shape. For each portion, the two sides forming the right angle are disposed partially filling the hollow space created by the pontoon 2 in one corner. That is to say, as shown in FIGS. 1A and 1B, there is one portion (of heave plate 4) per internal corner of the pontoon 2. In other words, each triangle plate is located in front of the base of a floating column 3. FIG. 6A shows a top view of a floating platform having a heave plate like the one just described (made of four portions of substantially right-angle triangle shape). FIG. 6B shows a top view of a floating platform according to another embodiment of the invention, in which the heave plate is a square-shaped ring heave-plate made of four substantially equal parts. Each part is made of two flat sheets defining a right-angle. The four parts are put together forming a ring of square shape disposed at the outer area of the centered spaced defined by the pontoon 2. In both embodiments, the heave plate 5 delimits the central hole of the platform. Thus, the heave plate 5 defines a substantially square hollow part, as explained later in detail. The surface of the heave plate 5 may have girders and reinforcements and is designed to retain water while providing rigidity. The platform 1 also has a catenary mooring system 6. As can be observed, the platform 1 has no reinforcing braces, crossbars or stringers connecting pairs of columns 3 along their length. There are neither braces connecting the columns with the pontoon or connecting the heave plate (or portions forming the heave plate) with the pontoon or the columns.

Figure 2A:
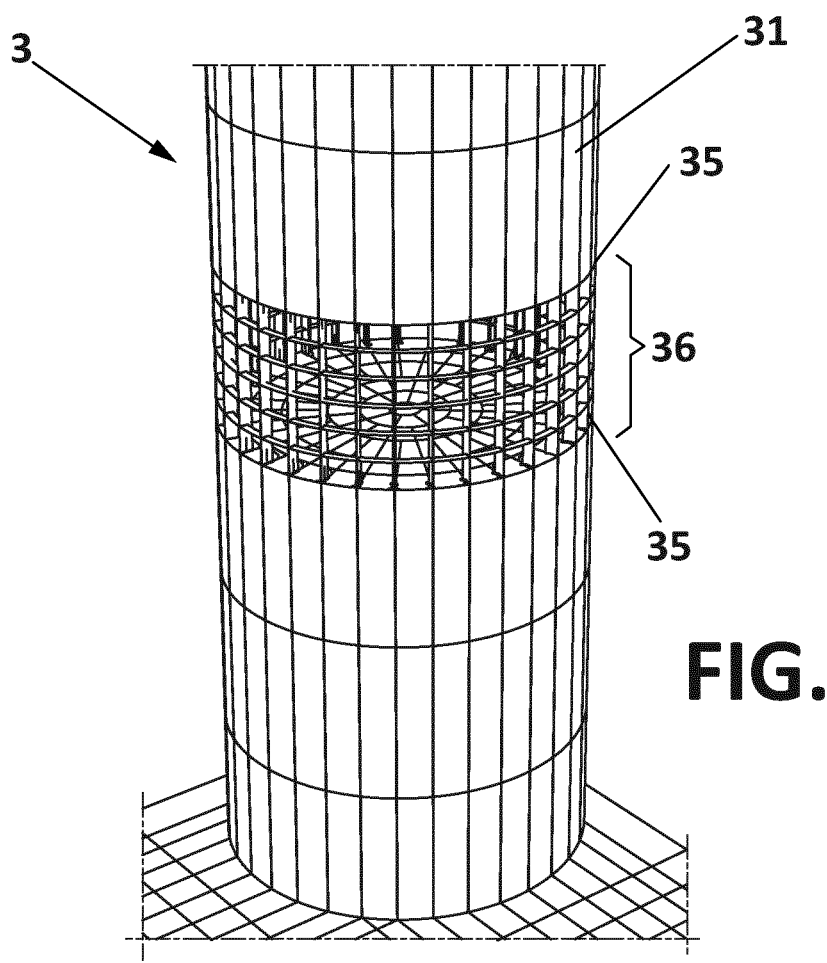
FIGS. 2A and 2B show two schemes of the internal structure of each column.
Figure 2B:
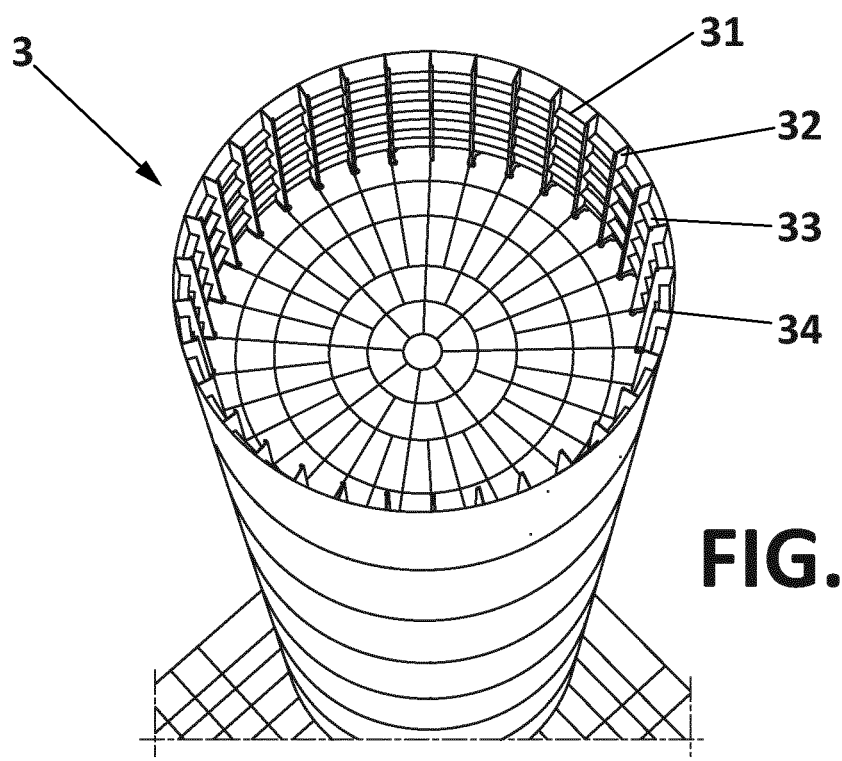

The columns 3 are preferably circular in cross section, although other shape of their cross-section may alternatively be used, such as rectangular cross section. The combination of the pontoon 2, heave plate 5 and columns 3 define a buoyant body. The four columns provide buoyancy to support the wind turbine and enough water plane inertia for the stability. FIGS. 2A and 2B show two schemes of the internal structure of the columns 3 according to embodiments of the invention, in which columns having circular cross section are used. In other words, in the shown embodiment the columns 3 have cylindrical shape. The columns 3 are at least partially hollow. As can be observed, each column may have an internal stiffening structure 31 that provides rigidity to the column. As shown in FIGS. 2A and 2B, the shell 32 of the columns is preferably stiffened with vertical girders 34 (such as 'T' profiles or bulb plates) and ring frames 33 (such as flat plates) to provide sufficient local and global yield and buckling strength. The girders and frames are preferably regularly spaced. The pressure to which each column is subjected in use of the platform increases from top to bottom of the column. In other words, the lower part of each column is subjected to higher pressure than the upper part of each column. Since deeper (lower) sections of the shell 32 is, in use of the platform, subjected to larger pressure loads, each column is preferably divided horizontally into a plurality of sections or construction blocks divided by reinforced decks 35 that are sized according to their largest head of water. FIG. 2A also shows the section 36 of a deck. This implies that all the members of the same typology have the same dimensions. The shell 32 of which each column is made is preferably metallic. In a particular embodiment, it is made of steel. The thickness of the metallic sheets varies depending on the height in the column at which these sheets are disposed (the lower in height, the thickest they are).

The four columns 3 provide buoyancy to support the wind turbine and enough water plane inertia for the stability. The ring pontoon 2 also provides buoyancy and stability. For this purpose, the platform 1 includes two types of ballast to ensure stability: fixed ballast—preferably concrete ballast—which is passive ballast, and active water ballast, which is removable and independent for each column. This water ballast is therefore variable, that is to say, the amount of water acting as ballast in each column is not fixed and is generally different for each column. Concerning the passive or fixed ballast, the ring pontoon 2 may be compartmentalized and partially filled with fixed concrete ballast. Therefore, this fixed ballast is in place during the operational life of the platform. As far as the active water ballast is concerned, ballast tanks are located in the bottom section of each column. There is preferably one ballast tank per column. The preferably one ballast tank of each column is independent from the ballast tanks of the other columns. In use of the platform, an active ballast system pumps sea water to each ballast tank to adjust the draft and to compensate for the mean inclination produced by wind loads on the turbine. Each water ballast tank is independent from the other ballast tanks, so there is no transfer of water ballast between columns. Ballast tanks are compartmentalized and each compartment is completely filled with water in operation, to avoid sloshing effects. In a particular embodiment, each tank is divided into a number of compartments preferably varying between 2 and 8, and more preferably between 2 and 5. In other words, the water filling each ballast tank does not travel from one column to another column. As a matter of example, in each column, the first (lowest) compartment, substantially matching the height of the pontoon 2, may be filled with fixed ballast, preferably concrete ballast, while the second compartment may be filled with sea water (variable ballast). The rest of the column is divided in additional compartments preferably varying between 2 and 6. The columns are preferably made of metal, more preferably of steel.

Figure 3:
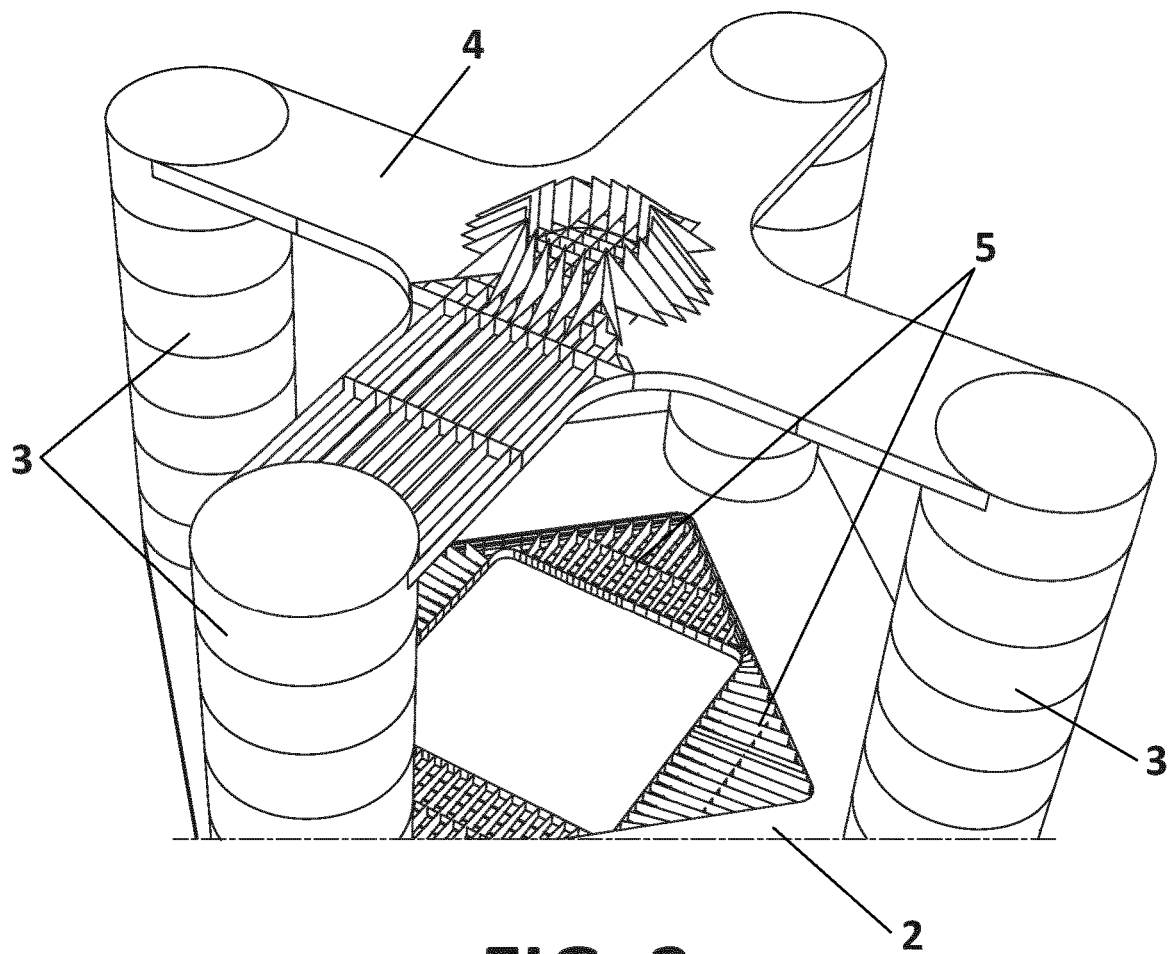
FIG. 3 shows a top view of the platform of FIGS. 1A and 1B, in which the deck or transition piece can be seen in more detail.

FIG. 3 shows the deck or transition piece 4 disposed on top of the four columns 3 and designed to support the wind turbine. In particular, an exploded view is shown, enabling to see the internal structure of the transition piece 4. The transition piece 4 is preferably a substantially flat piece. The transition piece 4 is made of four connections, preferably rectangular shaped, connecting the upper end of each of the four columns 3 with a central area of part 4, intended to receive the lowest end of a turbine tower. Thus, the upper end of the four columns 3 is located at the distal end of respective arms of the transition piece 4. In other words, transition piece 4 has four arms arranged in a star configuration and protruding from a central point. The four arms are preferably the same (same length, width and thickness). The central point is the point at which the bottom end of the turbine tower is connected. Preferably, the each pair of neighbor arms of the four arms forming the transition piece 4 is separated by an angle of 90°, that is, two neighbor arms form an angle of 90°. The connection between the transition piece 4 and the end of the four columns 3 is designed to be located above the splash zone, with a clearance above the largest wave crest with a return period of 100 years (that is to say, a 1% probability of being subject to a largest wave crest in one year). The wind turbine is designed to be located centered relative to the columns. The transition piece 4 is preferably made of metal, more preferably of steel.

Figure 4A:
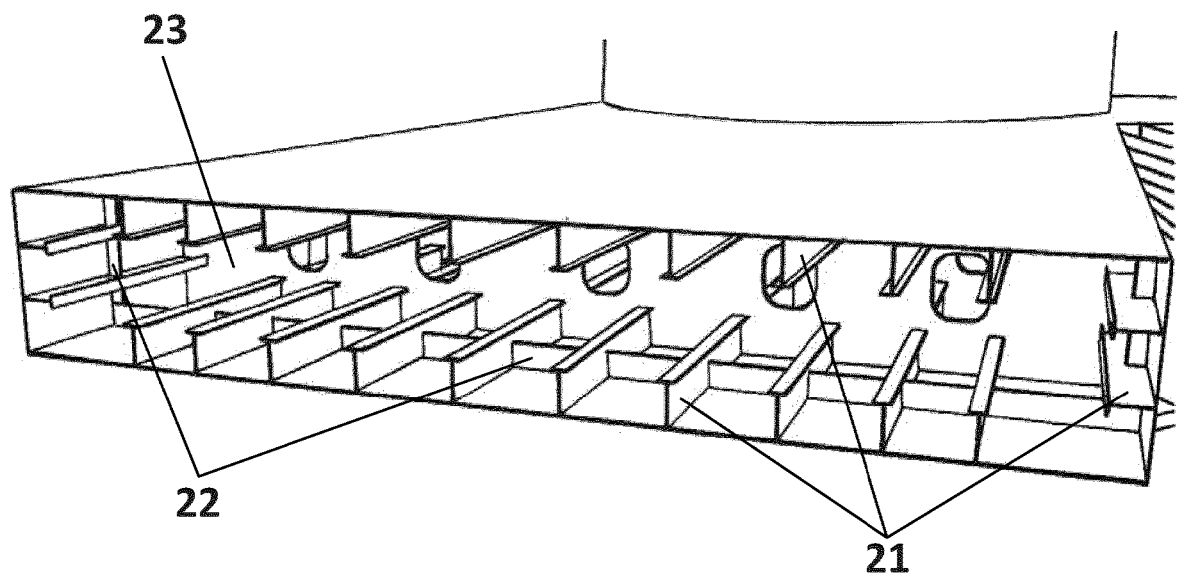
FIGS. 4A, 4B and 4C show in detail the internal structure of two neighbor portions forming the pontoon.
Figure 4B:
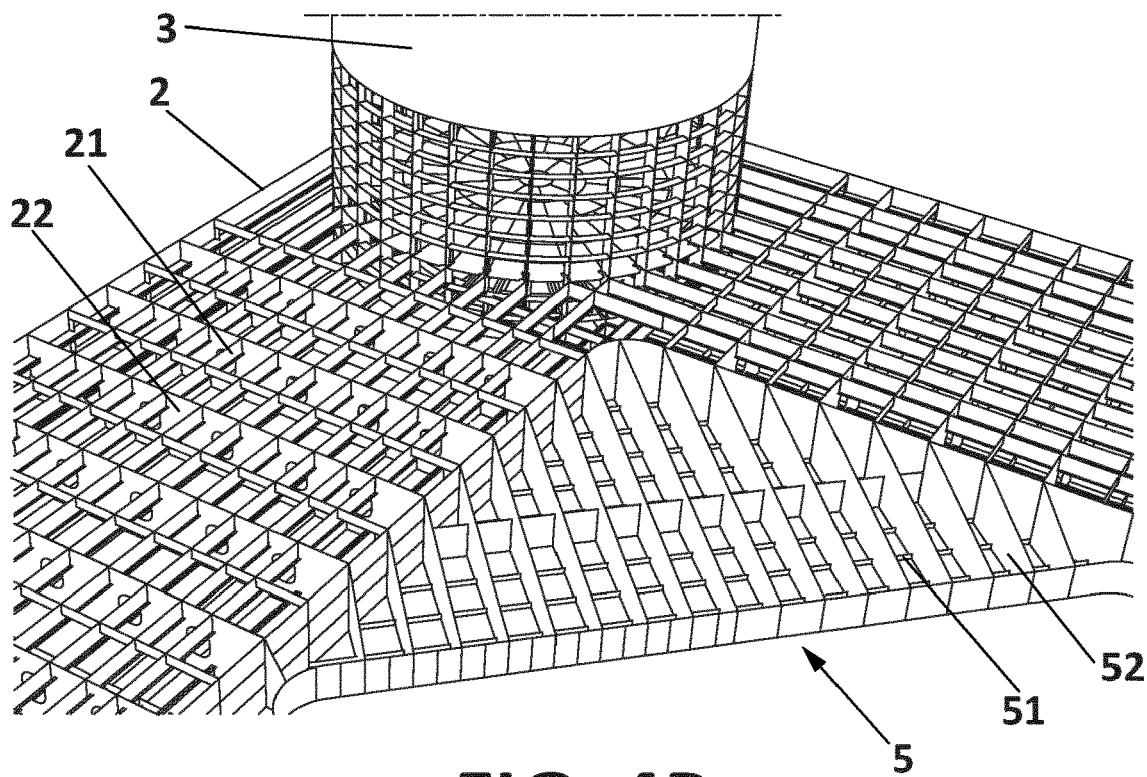
Figure 4C:
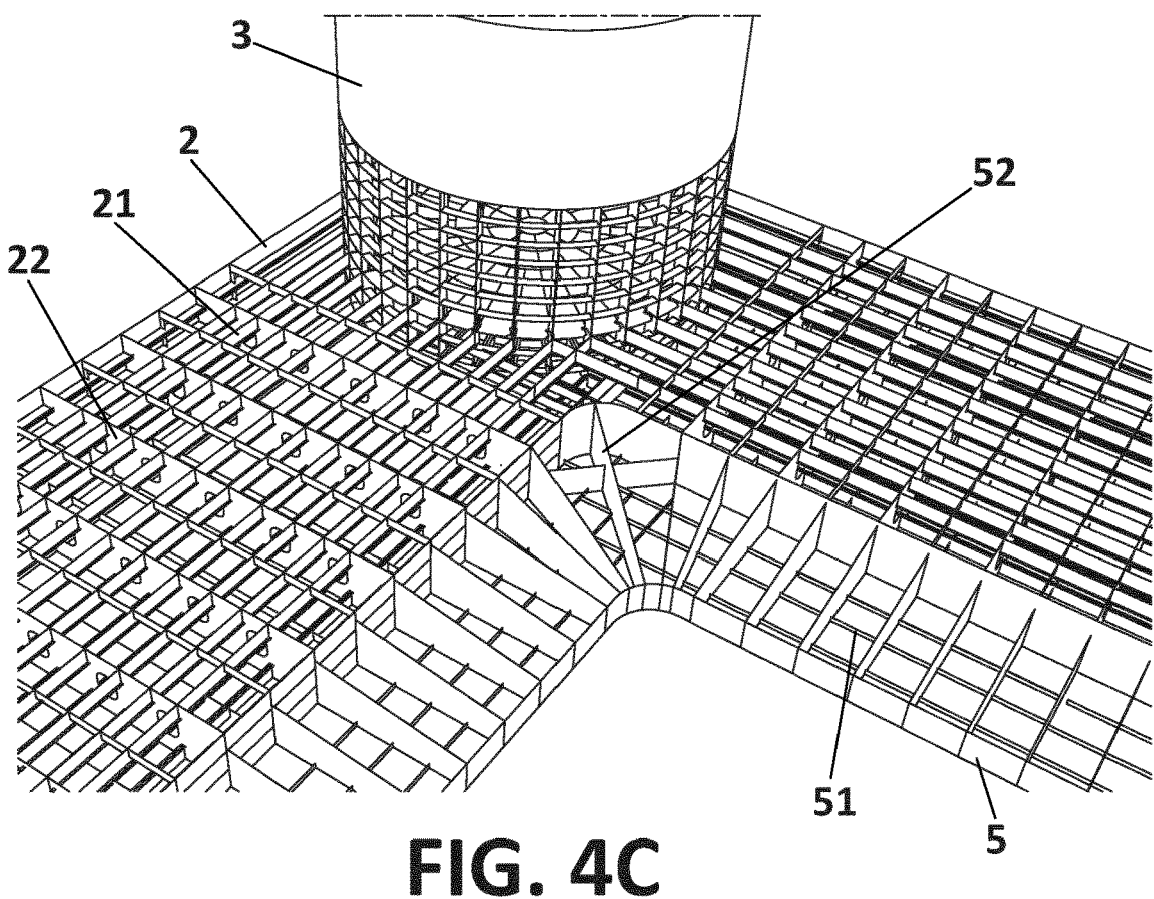

Referring back to FIGS. 1A and 1B, the platform 1 has a ring-shaped pontoon 2, that is, a pontoon defining a hollow in its inner part, interconnecting columns at their lower ends. In use of the platform as an offshore structure for supporting one or more wind turbines, the pontoon 2 is submerged. The pontoon 2 is preferably of squared ring-shape. As shown in FIG. 4A, illustrating the internal structure of the pontoon 2, the pontoon 2 is preferably divided by bulkheads 23 into a plurality of compartments or construction blocks that may be filled with fixed ballast, such as concrete. The pontoon hull is preferably stiffened with ring frames or stringers 22 and girders 21 (horizontal girders) as shown in FIGS. 4B and 4C. Frames 22 and girders 21 are preferably regularly spaced. The outer structure of the pontoon 2, as well as its frames 22 and girders 21, are made of metal, such as steel. Fixed ballast may partially or totally fill the inner volume of the pontoon 2. The pontoon 2 may be made up of four substantially flat portions. Pairs of portions are aligned two to two and adjacent portions form a 90° angle between each other, the four of them forming a substantially flat part having an internal hollow. Thus, each pontoon portion is attached to the base of pairs of adjacent columns. Each pontoon portion extends between the base of pairs of adjacent columns. The outer contour of the pontoon 2 does not exceed the contour of the columns 3. FIG. 4B shows in detail another view of the internal structure of two neighbor portions and how they connect to the lowest end of one of the four columns 3 of the platform. The girders 21 along the portions forming the pontoon 2 and stringers 22 transversally disposed with respect to the girders 21 are also shown. The lowest end of the shown column 3 may be welded to the stiffening reinforcement (girders and stringers) of the pontoon 2. Preferably, the stiffening reinforcement of the pontoon matches with the stiffening reinforcement of each column in order for a better transmittal of efforts.

Figure 5A:
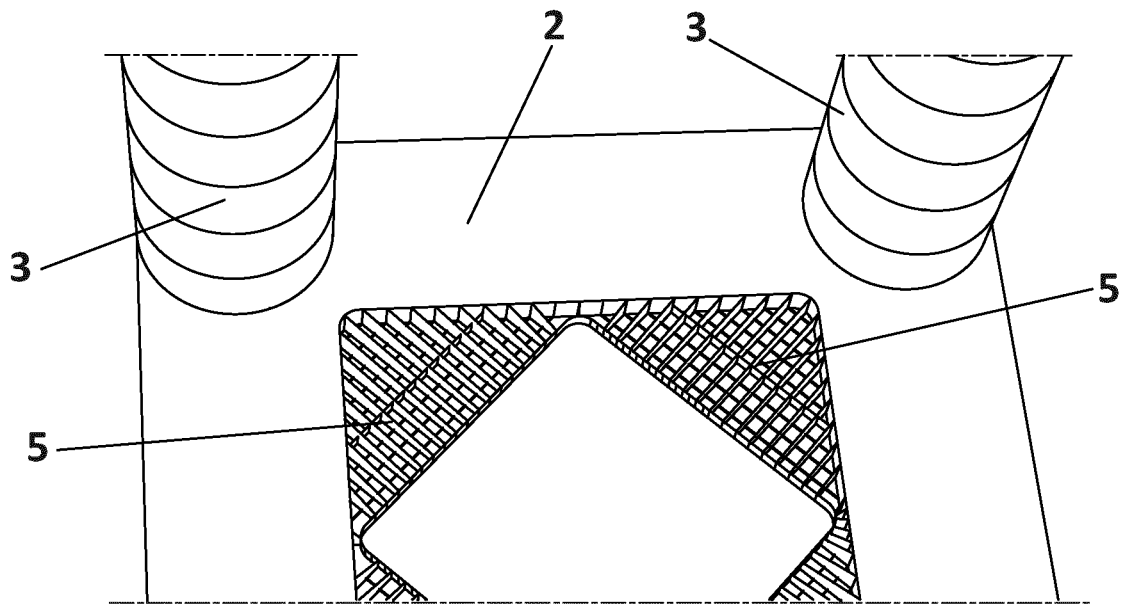
FIGS. 5A and 5B show different views showing the internal structure of one of the possible implementations of the heave plate of a platform according to an embodiment of the invention.
Figure 5B:
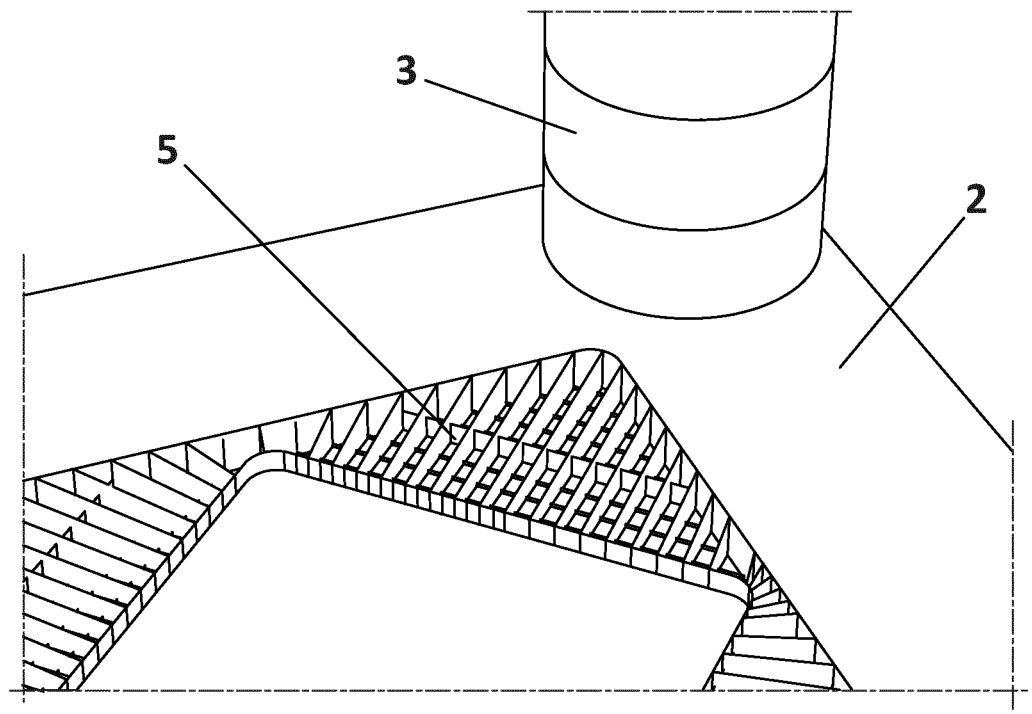

FIG. 4B also shows the internal structure of part of the heave plate 5, which in this case is a heave plate having triangle-shaped portions. It is remarked that although FIG. 4B refers to a heave plate 5 having triangle-shaped portions, the internal structure of the heave plate applies similarly to a heave plate made of four rectangles (as described in relation to FIGS. 4C and 6B). The heave plate 5 (more precisely, each of the four portions forming the heave plate) may be internally be stiffened longitudinally with girders 51 and stringers 52 transversally disposed with respect to the girders 51. The girders 51 and/or stringers 52 are preferably disposed regularly spaced. Preferably, the stiffening reinforcement of the pontoon (girders 21 and stringers 22) matches with the stiffening reinforcement of each portion of heave plate (girders 51 and stringers 52) in order for a better transmittal of efforts. In the embodiment shown in FIGS. 4B and 4C, the height of the heave plate 5, defined by the height of its outer structure and by the height of its stringers 52, is substantially the same as the height of the pontoon 2, which is defined by the height of its outer structure and by the height of its stringers 22. In other words, it forms a trapezoid. Using vertical flat sheets contribute to water trapping and to generate viscous damping due to vorticities generated at the edges thereof. As can be seen in FIGS. 4B and 4C, the heave plate 5 is preferably a single part, that is to say, each portion (such as triangle-shape or rectangular shape portion) is connected to neighbor portions and their internal structure is also connected. The heave plate 5, including girders 51 and stringers 52, is preferably made of metal, more preferably of steel. FIGS. 5A and 5B also show the internal structure of the heave plate 5 and the location of the heave plate with respect to the pontoon 2 and columns 3 of a platform according to an embodiment of the invention. In this embodiment, the heave plate 5 is made of four triangles, but in alternative embodiments it may be made of rectangles. The heave plate, that is to say, the four portions forming the heave plate 5, are located at the bottom of the structure and in between the columns 3, attached to the internal perimeter of the pontoon 2. The heave plate is preferably supported by cantilevered beams ensuring structural continuity of the column and pontoon reinforcements. One end of a cantilever beam is fixed to the structure (pontoon) and the other end is free (hollow). The structural continuity works if there is a union between two structural elements that guarantee the transfer of the requests, in this case stringers 22 with stringers 52. No braces (also called truss members) are used to support the portions forming the heave plates. The portions forming the heave plate are internal to the perimeter defined by the pontoon. As can be seen in FIGS. 5A and 5B and in FIGS. 6A and 6B, each column (precisely, the base of each column) is disposed closed to the outer diameter of respective corners of the pontoon. The heave plate 5 extends from the inner perimeter of the pontoon 2 towards the inner part of the hollow defined by the pontoon 2 (in other words, towards the inner part of the platform).

FIGS. 6A and 6B show respective top views of the buoyant body according to two possible embodiments of the invention. The transition piece is not shown (in operation it is not submerged). In this figures three important design areas or surfaces of the platform are identified: a first surface S1 representing the surface occupied by the pontoon 2 and the four columns 3; a second surface S2 representing the surface occupied by the heave plate 5; and an open surface S3, disposed in the center of the structure and limited by the heave plate and pontoon. In a preferred embodiment of the invention, the ratio between the open area S3 to the total area (S1+S2+S3) is designed such that the natural period of the platform in heave is kept equal to or above 20 seconds, as explained next. This ratio may vary depending at least on the wind turbine rated power, as explained next. It may also vary depending on the deployment site conditions.

The natural frequencies of the whole platform must be out of the sea range periods to avoid resonances. This implies that the rigid body eigen-periods of the set comprised by the floating platform, wind turbine and mooring system must be out of the range varying between 5 s and 19 s (which correspond to the sea periods).

For semi-submersible platforms, according to DNV-RP-C205 (April 2014)—Table 7.1, the natural period for the heave degree of freedom (up/down) is around 20s. Therefore, in heave the excitation force has a period close to the typical natural period of the platform which implies danger of enter in resonance. For avoiding this phenomenon, the surface facing the heave movement (vertical movement) is the key parameter as it is explained below.

The natural period in heave is given by, $$T_3 = 2\pi \left( \frac{M + A_{33}}{\rho g S} \right)$$

Where,
M Mass of the whole structure (steel structure, ballast, wind turbine, mooring system, etc.).
$A_{33}$ Heave added mass. It is the inertia added to the platform during vertical movements because when accelerating or decelerating in heave, the platform move (or deflect) the volume of surrounding fluid as it moves through it. The added mas in heave is directly proportional to S1+S2, or in other words, inversely proportional to surface S3.

ρ Sea water density g Acceleration of the gravity

S Water plane area. Is the enclosed area of the four columns at the waterline.

Figure 7:
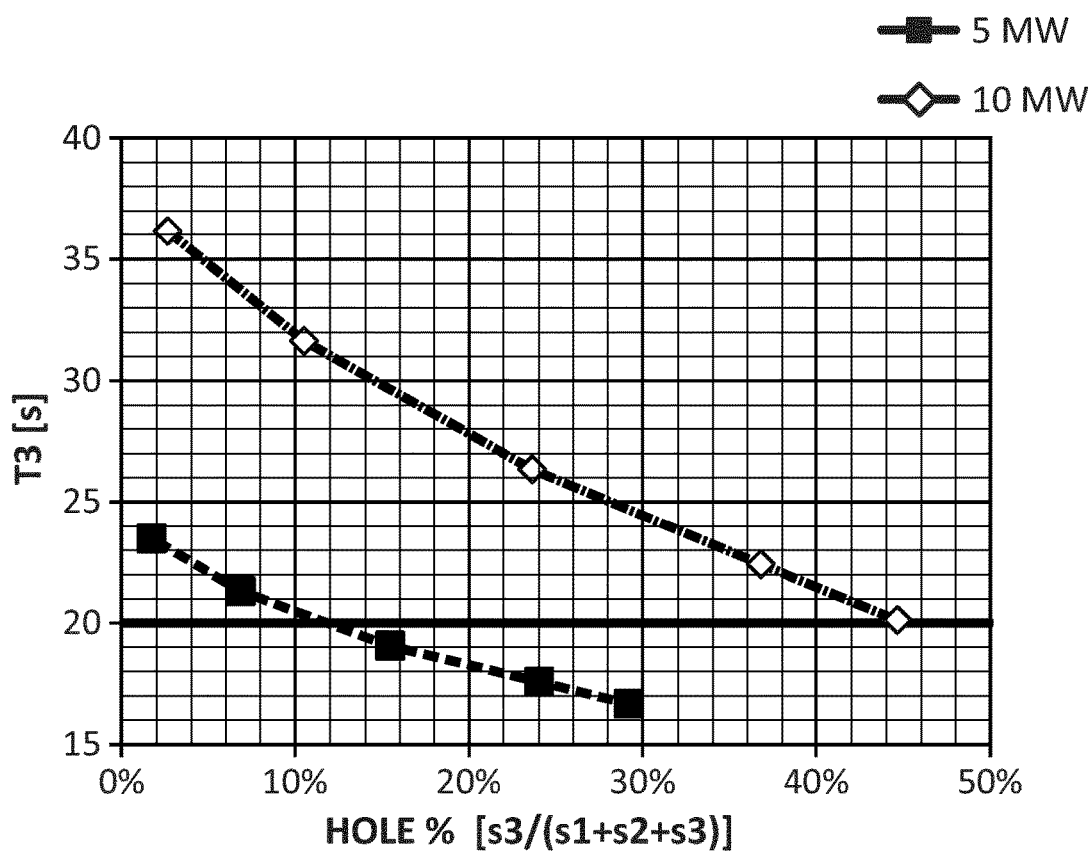
FIG. 7 shows a chart representing different values of natural period in heave for different ratios of surfaces of pontoon, heave plate and hollow defined by the heave plate and pontoon, for two different types of wind turbine.

Applying the previous formula to the current platform design, considering different hole apertures, heave plates typologies and different wind turbines power characteristics, the chart shown in FIG. 7 is obtained. FIG. 7 shows the natural period in heave $T_3$ for different ratios of S3/(S1+S2+S3) for two different wind turbines; a 5 MW wind turbine and a 10 MW wind turbine, the second one being bigger and heavier, as a consequence of which the floating platform must support larger loads. For a 5 MW wind turbine, with the aim of having a natural period in heave higher than 20 s (that is, out of the sea periods typically varying between 5 and 19 s) the ratio of S3/(S1+S2+S3) must be at most 12%. The lower is the percentage, the higher is the cost because more metal (i.e. steel) structure is needed. For a 10 MW wind turbine, with the aim of having a natural frequency period in heave higher than 20 s (that is, out of the sea periods) the ratio of S3/(S1+S2+S3) must be at most 45%. The lower is the percentage, the higher is the cost because more steel structure is needed. Although not shown in FIG. 7, if wind turbines of power between 5 MW and 10 MW (for example 6 MW, 7, 8 MW or 9 MW) are used, the natural period in heave $T_3$ curve will show that the ratio of S3/(S1+S2+S3) must be between 12% and 45%. Therefore, the platform is preferably designed such that the natural period of the platform in heave $T_3$ is kept equal to or above 20 seconds. The specific value of ratio S3/(S1+S2+S3) that enables that the natural period of the platform in heave $T_3$ is equal or above 20 seconds depends on the type of the wind turbine (in particular, on the power thereof, which has an effect on its size and weight). In a most preferred embodiment, attending to the structure minimum cost, the natural period of the platform in heave $T_3$ is kept as close as possible to 20 seconds without being lower than 20 seconds, in order to be out of the sea periods typically varying between 5 and 19 s.

In a particular embodiment of the invention, and considering wind turbines varying between 5 MW and 10 MW, the ratio between the open area S3 to the total area (S1+S2+S3) is kept between 12% and 45%.

Referring now to the columns of the platform, in some embodiments of the invention, the ratio 'column diameter D/distance between column centres L' is kept as follows:

$$3 < L/D < 6.75$$

Figure 8A:
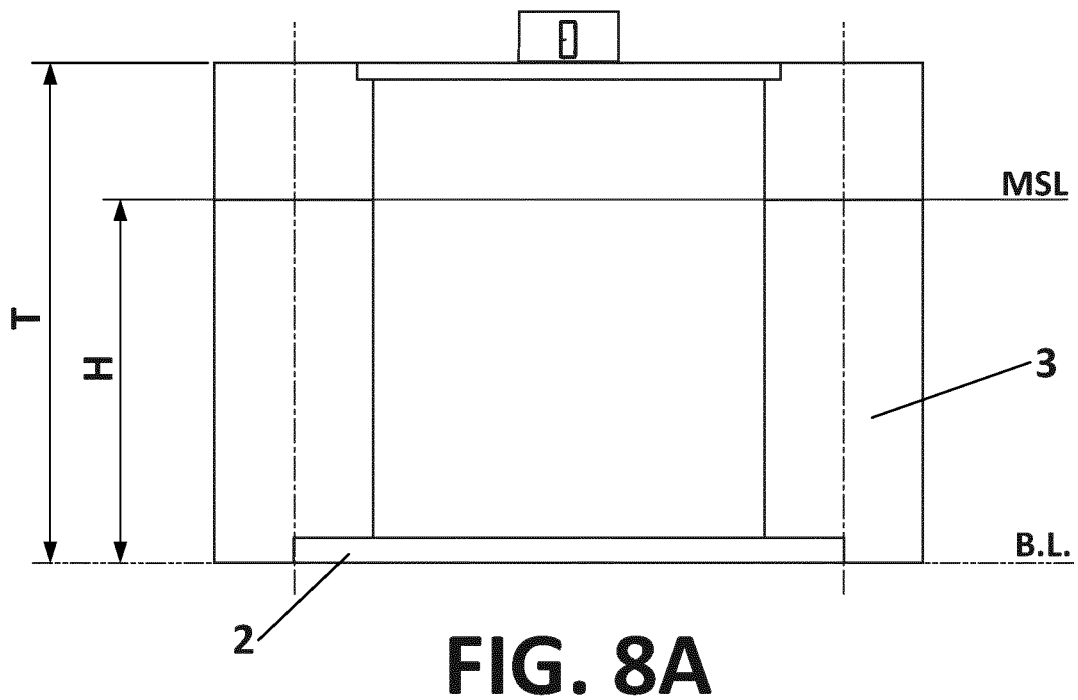
FIG. 8A shows a top view of the semi-submersible floating offshore platform according to an embodiment of the invention, including the transition piece, pontoon, heave plate and four columns.
Figure 8B:
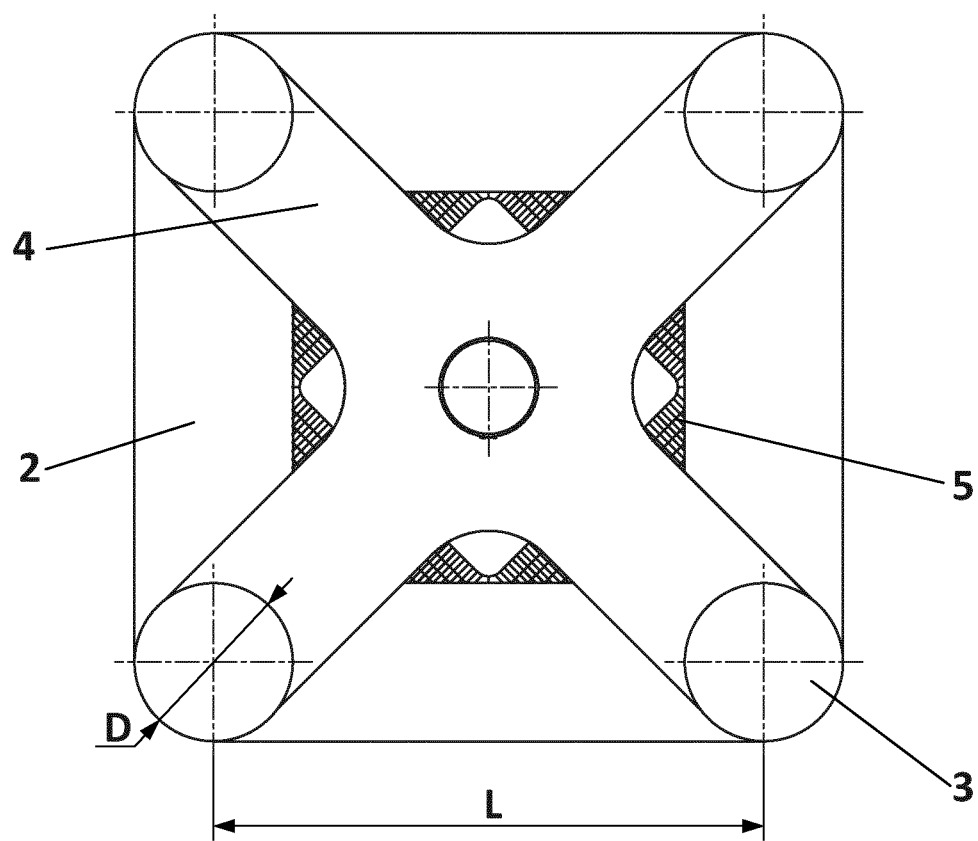
FIG. 8B shows a side view of the semi-submersible floating offshore platform according to an embodiment of the invention.

This is represented in FIG. 8B, wherein the distance between column centres L and the column diameter D is shown. In FIG. 8A, also the column height H, the draft T and the mean sea level MSL are shown. Reasons for this selection 3<L/D<6.75 are explained next.

In a preferred embodiment of the invention, the ratio between distance between column centres L and the column diameter D is designed such that the natural period of the platform in heave and the natural period of the platform in pitch/roll (rotation) is kept equal to or above 20 seconds, as explained next. This ratio may vary depending at least on the wind turbine rated power.

With the aim of improving the stability while reducing the heeling/trimming angle against overturning due to wind turbine loads, the platform is preferably designed to have metacentric height ($\overline{GM}$) always bigger than 6 m. FIGS. 9A and 9B respectively show the upright floating position and the heeling position of the platform according to embodiments of the invention.

The metacentric height ($\overline{GM}$) can be calculated as:

$$\overline{GM} = \overline{KB} + \overline{BM} - \overline{KG} \qquad \text{Eq. 1}$$

Where, $\overline{KB}$ Centre of buoyancy (height above the keel, the keel being considered the lowest point of the platform), wherein K and B are shown in FIGS. 9A and 9B. B is a movable point due to inclinations.

$\overline{BM}$ Distance between the centre of buoyancy and the metacentre and can be considered fixed for small heeling/trimming angles. M and G are also shown in FIGS. 9A and 9B.

$$\overline{BM} = I/\nabla \qquad \text{Eq. 2}$$

where I is the second moment of area of the waterplane and $\nabla$ is the displaced volume. For the current platform, assuming that the stability is mainly provided by the columns, it can be considered that:

$$I \approx 4\pi\left(\frac{D}{2}\right)^2 \left(\frac{L}{2}\right)^2 + \pi\left(\frac{D}{2}\right)^4 \qquad \text{Eq. 3}$$

$$\nabla \approx 4\pi\left(\frac{D}{2}\right)^2 T \qquad \text{Eq. 4}$$

Where, according to FIGS. 8A and 8B, is the column diameter, T is the draught and L is the distance between column centres.

$\overline{KG}$ Distance between the centre of gravity and the keel, as shown in FIGS. 9A and 9B.

Substituting Eq. 3 and Eq. 4 into Eq. 2:

$$\overline{BM} \approx \frac{\left(\frac{L}{2}\right)^2}{T} + \frac{\left(\frac{D}{2}\right)^2}{4T} \qquad \text{Eq. 5}$$

Considering that for the current platform $\overline{KB} \approx \overline{KG}$, $\overline{GM} > 6$ and substituting Eq. 5 into Eq. 1 the following expressions are obtained:

$$\frac{\left(\frac{L}{2}\right)^2}{T} + \frac{\left(\frac{D}{2}\right)^2}{4T} > 6 \qquad \text{Eq. 6}$$

$$4(L)^2 + (D)^2 > 96D \qquad \text{Eq. 7}$$

$$4\left(\frac{L}{D}\right)^2 + 1 > 96\frac{D}{(D)^2} \qquad \text{Eq. 8}$$

$$\frac{L}{D} > \sqrt{24\frac{T}{(D)^2} - \frac{1}{4}} \qquad \text{Eq. 9}$$

$$\frac{L^2}{D^2} > 24\frac{T}{D^2} - \frac{1}{4} \qquad \text{Eq. 10}$$

$$L^2 > 24T - \frac{D^2}{4} \qquad \text{Eq. 11}$$

$$4L^2 + D^2 > 96T \qquad \text{Eq. 12}$$

The relation between column centres, draught and diameters expressed in Eq. 12 has been deducted from the premise of $\overline{GM} > 6$ established for reducing the heeling/ trimming angle against overturning due to wind turbine loads. However, this value has a maximum determined by the natural period of the rotational motions, pitch and roll, to avoid resonances with the sea excitation forces.

The natural period of rotational motions ($T_0$) is defined by the Eq. 13 and must be out of the sea excitation forces (5-19 s). Notice that in the current platform design, due to symmetry in transversal and longitudinal directions, the natural periods in pitch and roll are equal.

$$T_0 = T_4 = T_5 = 2\pi \sqrt{\frac{I + A_0}{\rho g \nabla \cdot \overline{GM}}} \qquad \text{Eq. 23}$$

Where,
I Inertia of the whole structure (steel, ballast, wind turbine, mooring system, etc.) in the roll/pitch degree of freedom.
$A_0$ Roll/pitch added inertia. It is the inertia added to the platform during rotational movements because when accelerating or decelerating in roll/pitch, the platform move (or deflect) the volume of surrounding fluid as it moves through it.
ρ Sea water density.
g Acceleration of gravity.
S Water plane area. Is the enclosed area of the four columns at the waterline.
∇ Displaced volume.
$\overline{GM}$ Metacentric height.

As can be seen in Eq. 13, an increase in the GM causes a reduction of the rotational (pitch and roll) period with the consequent risk of being within the sea period range.

Figure 10:
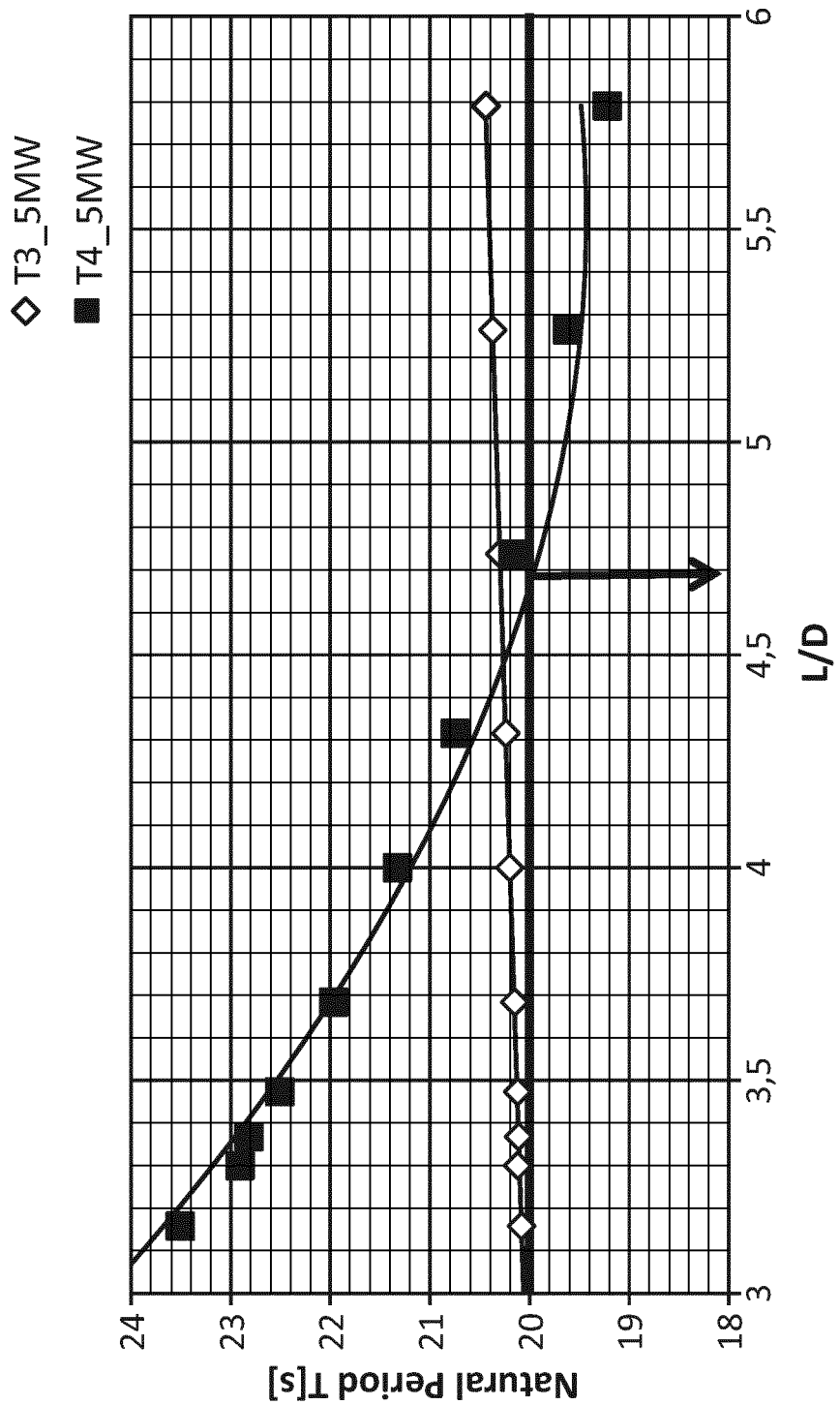
FIG. 10 shows a chart representing different values of natural period in heave and rotational natural period (pitch, roll) for a 5 MW wind turbine for different ratios distance between columns/column diameter.
Figure 11:
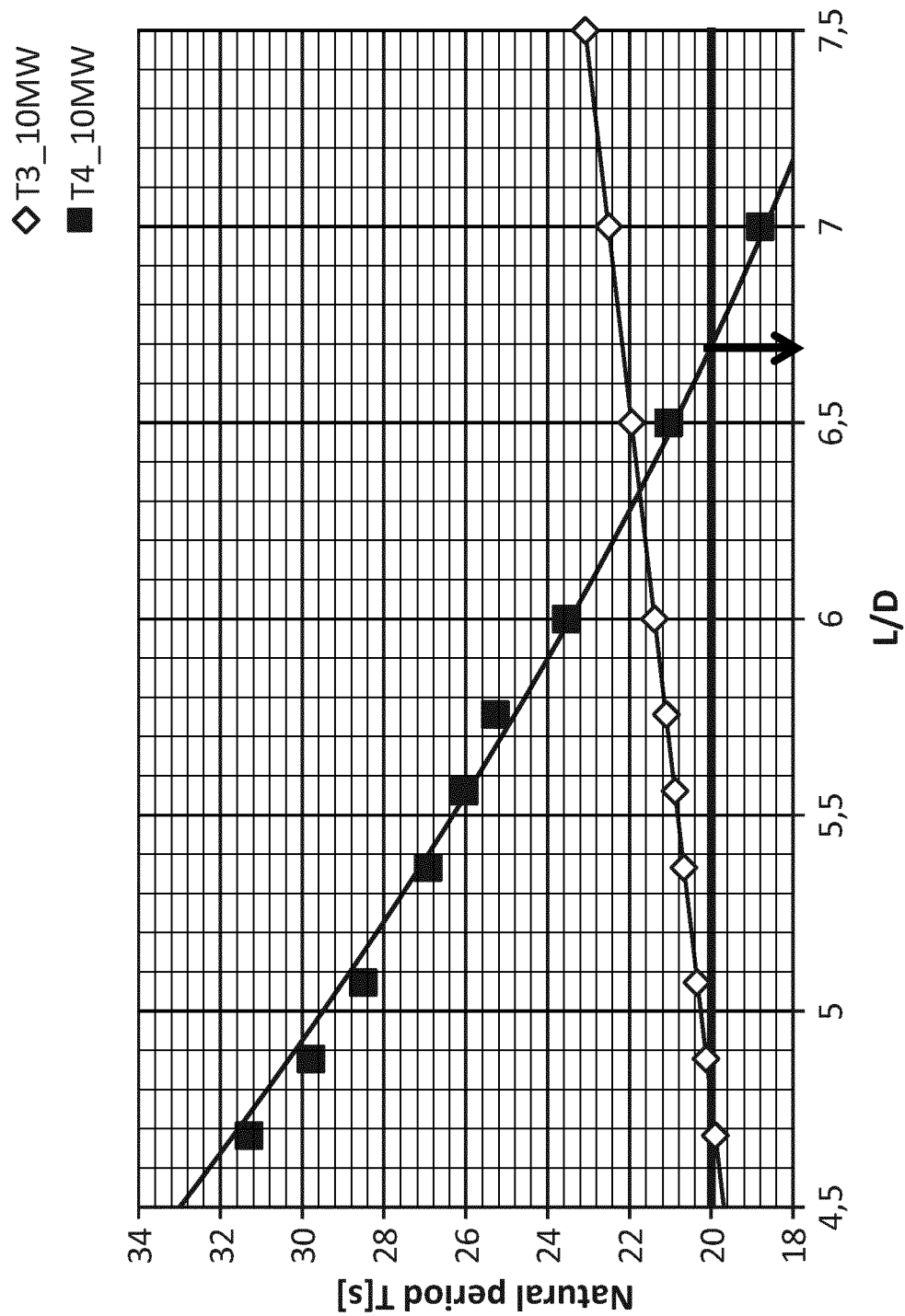
FIG. 11 shows a chart representing different values of natural period in heave and rotational natural period (pitch, roll) for a 10 MW wind turbine for different ratios distance between columns/column diameter.

Applying the previous formula (Eq. 13) to the current platform design for calculating the rotational (pitch/roll) natural period, considering the ration between surfaces S3/(S1+S2+S3) already discussed for avoiding resonances in heave and analysing different wind turbines power characteristics, FIGS. 10 and 11 are obtained.

FIG. 10 shows that for a 5 MW wind turbine, with the aim of having a heave (T3) and pitch/roll (T4) natural frequency out of the sea periods (5-19 s), the ratio 'distance between columns–column diameter' must be larger than 3 and lower than 4.75, while FIG. 11 shows that for a 10 MW wind turbine, with the aim of having a heave (T3) and pitch/roll (T4) natural frequency out of the sea periods (5-19 s), the ratio 'distance between columns–column diameter' must be bigger than 4.75 and lower than 6.75.

Therefore, in a particular embodiment for avoiding resonances, the ratio 'distance between columns–column diameter' must be larger than 3 and lower than 6.75. This ratio is preferably narrowed (adjusted) for each specific wind turbine. Thus, while for a 5 MW wind turbine 3<L/D<4.75, and for a 10 MW wind turbine 4.75<L/D<6.75, for other values of wind turbines (such as 6 MW, 7 MW, 8 MW . . . ) this ratio may be different.

In sum, due to the nature of the application (offshore wind energy) for which current floating platform is designed, the platform must be designed considering restrictions in terms of heave, pitch and roll natural periods, which for example Oil&gas structures do not have. As a consequence, the specific geometric relations proposed for the current floating platform are completely different than those that may be used for Oil &gas applications.

Turning back to FIGS. 1A and 1B, the floating platform 1 has a catenary mooring system 6. The platform 1 is anchored to the seabed using conventional mooring lines and drag embedded anchors. The mooring lines 6 may be attached to the columns under the operational waterline using a fairlead. Preferably, the number of mooring lines is the same for all the columns 3. The energy generated by means of the platform (in particular, by the wind turbine and auxiliary equipment disposed on the transition piece) is evacuated by a dynamic cable that connects the floating platform at one end, and another floating platform or another cable to the other end, depending on the configuration of the wind farm.

Next, the manufacturing and installation procedure of a platform like the one described with reference to FIGS. 1A to 8 is described.

First, the structure can be manufactured by blocks (columns, pontoons and transition piece).

The blocks are then assembled. The assembling stage can be performed in different locations, such as in a (i) shipyard, (ii) dry dock, (iii) port dock or (iv) semisubmersible pontoon.

After its completion, the structure (platform) is loaded out into the water. Depending on the manufacturing facility, the load out operation may require (i) a slipway, (ii) the dry dock flooding, (iii) a crane, a semisubmersible pontoon or a synchro-lift or (iv) the pontoon flooding. In all cases, the required draft for the load out is around 6 m.

Then, the platform is towed to the wind turbine assembly area—port dock—requiring a draft of around 15 m.

At this stage, passive concrete ballast is poured into the pontoons.

After passive concrete ballast is added, the wind turbine is assembled on top of the floating structure using an onshore crane.

In case of assembly in dry dock (ii), the last two steps (passive concrete ballast is poured into the pontoons and assembling the wind turbine on top of the floating structure using an onshore crane) can be performed in the dry dock.

The whole structure is towed to the deployment site in deep water (>50 m), where the mooring lines and an umbilical cable are pre-installed.

Active ballast system is used to reach the operational draft of the structure by filling the tanks with sea water.

The structure is hooked-up to the moorings and the umbilical cable is attached to the structure.

If required, the whole structure can be disconnected from the mooring lines and umbilical cable and towed to port for major repairs.

The same procedure is applicable for the decommissioning: disconnection of the mooring lines and umbilical cable and towing the floating structure included the wind turbine to the dismantling area.

In sum, a new floating offshore platform for supporting wind energy equipment has been disclosed. The platform is aimed at supporting floating offshore wind equipment by providing an optimized technical solution that maximizes energy production of large wind turbines (for example from 5 to 10 MW) while limiting expensive offshore integration and maintenance procedures, since the manufacturing of the platform and its deployment in the sea together with wind turbines, generators, and other auxiliary equipment, is of great simplicity.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A semisubmersible floating platform (1) for supporting at least one wind turbine, comprising:
   four buoyant columns (3), deck having a transition piece (4) having four arms arranged in star configuration and protruding from a central point on which the wind turbine is located in use of the platform, the transition piece (4) being disposed on the buoyant columns (3) at an upper end of the columns (3) opposite a first end, the connection between the transition piece (4) and the upper end of the four columns (3) being designed to be located above a sea splash zone; and a heave plate (5);
   a quadrilateral-shaped ring pontoon (2) comprising four pontoon portions, wherein the first end of each column (3) is attached to a respective corner of said quadrilateral-shaped ring pontoon (2), the heave plate (5) being assembled to an internal perimeter of the quadrilateral-shaped ring pontoon (2), the quadrilateral-shaped ring pontoon (2) and the heave plate (5) defining a hollow region, wherein
   each of the buoyant columns (3) comprising at least one ballast tank configured for, in use of the platform, allocating sea water in order to adjust the draft and to compensate for the inclination of the platform (1), said at least one ballast tank comprised in each column (3) being independent of the at least one ballast tank of the other columns (3).

2. The platform (1) of claim 1, wherein said heave plate (5) is formed at four portions located in the internal perimeter of the quadrilateral-shaped ring pontoon (2), said four portions of which the heave plate (5) is formed being triangle-shape portions or rectangular-shape portions.

3. The platform (1) of claim 1, further comprising an active ballast system configured to pump in/off sea water to each ballast tank of said columns (3), said pumping of sea water being made to each ballast tank independently from the pumping of sea water to other ballast tanks.

4. The platform (1) of claim 1, wherein each column (3) is internally stiffened orthogonally with girders and stringers.

5. The platform (1) of claim 1, wherein each column (3) is internally divided into a plurality of sections.

6. The platform (1) of claim 1, wherein the four columns (3) have a same diameter (D), the ratio between the distance between two adjacent columns (L) and said column diameter (D) being selected such that the natural period of the platform in heave and the natural period of the platform in pitch/roll is kept equal to or above 20 seconds, said ratio varying depending on the wind turbine power.

7. The platform (1) of claim 1, wherein the rate between the surface (S3) of the hollow region defined by the quadrilateral-shaped ring pontoon (2) and heave plate (5) and the sum of the surface (S1) occupied by the quadrilateral-shaped ring pontoon (2) plus the surface (S2) occupied by the heave plate (5) plus the surface (S3) of the hollow region defined by the quadrilateral-shaped ring pontoon (2) and heave plate (5) is selected such that the added mass is enough to keep the natural period of the platform in heave/roll/pitch out of wave periods of between 5 and 19 seconds.

8. The platform (1) of claim 1, wherein the quadrilateral-shaped ring pontoon (2) is divided into a plurality of compartments configured to be filled with ballast.

9. The platform (1) of claim 1, wherein the quadrilateral-shaped ring pontoon (2) internally comprises a stiffening structure comprising girders and stringers.

10. The platform (1) of claim 1, wherein the heave plate (5) internally comprises a stiffening structure comprising girders and stringers.

11. The platform (1) of claim 4, wherein the heave plate (5) is supported by cantilevered beams ensuring structural continuity of the columns and pontoons reinforcements.

12. The platform (1) of claim 1, further comprising a wind turbine generator placed on said central point of the transition piece (4).

13. The platform (1) of claim 1, wherein in use of the platform, the transition piece (4) remains above a wave zone.

14. The platform (1) of claim 1, further comprising a catenary mooring system comprising a plurality of catenary mooring lines configured to fix the platform to the seabed.

15. The platform (1) of claim 1, wherein said quadrilateral-shaped ring pontoon (2) is a square-shaped ring pontoon (2).

* * * * *